(12) United States Patent
Bulski

(10) Patent No.: US 12,560,012 B2
(45) Date of Patent: Feb. 24, 2026

(54) VEHICLE HOOD HINGE ASSEMBLY

(71) Applicant: NISSAN NORTH AMERICA, INC.,
Franklin, TN (US)

(72) Inventor: Nicholas Stan Bulski, Ferndale, MI
(US)

(73) Assignee: NISSAN NORTH AMERICA, INC.,
Franklin, TN (US)

( * ) Notice: Subject to any disclaimer, the term of this
patent is extended or adjusted under 35
U.S.C. 154(b) by 99 days.

(21) Appl. No.: 18/459,399

(22) Filed: Aug. 31, 2023

(65) Prior Publication Data

US 2025/0075547 A1      Mar. 6, 2025

(51) Int. Cl.
| | |
|---|---|
| *B60R 21/38* | (2011.01) |
| *B62D 25/12* | (2006.01) |
| *E05D 3/02* | (2006.01) |
| *E05D 5/04* | (2006.01) |
| *E05D 11/00* | (2006.01) |
| *E05F 15/50* | (2015.01) |

(52) U.S. Cl.
CPC .............. *E05D 11/00* (2013.01); *B62D 25/12*
(2013.01); *E05D 3/02* (2013.01); *E05F 15/50*
(2015.01); *E05D 2011/009* (2013.01); *E05Y*
*2900/536* (2013.01)

(58) Field of Classification Search
CPC ......... E05Y 2900/536; E05D 2011/009; B60R
21/38; B60R 21/34; B60R 2021/0004;
B60R 2021/343
See application file for complete search history.

(56) References Cited

U.S. PATENT DOCUMENTS

| | | | | |
|---|---|---|---|---|
| 3,747,271 | A | * | 7/1973 | Adamski ............... E05F 1/1276 |
| | | | | 49/386 |
| 5,544,388 | A | * | 8/1996 | Chiura .................... E05D 11/06 |
| | | | | 16/86 B |
| 6,371,231 | B1 | | 4/2002 | Nushii et al. |
| 6,520,557 | B2 | * | 2/2003 | Benthaus .............. E05F 1/1091 |
| | | | | 296/76 |
| 6,618,904 | B1 | * | 9/2003 | Nagy .................... E05F 1/1292 |
| | | | | 16/370 |
| 7,137,174 | B2 | * | 11/2006 | Derbis .................... E05F 15/63 |
| | | | | 49/248 |

(Continued)

FOREIGN PATENT DOCUMENTS

| | | | | | |
|---|---|---|---|---|---|
| DE | 102023109932 | B3 | * | 5/2024 | ............. B60R 21/38 |
| EP | 1394000 | A1 | | 3/2004 | |

(Continued)

*Primary Examiner* — Emily M Morgan
(74) *Attorney, Agent, or Firm* — Spencer Fane, LLP

(57) ABSTRACT

A vehicle hood hinge assembly includes a first bracket and
a second bracket. The first bracket has a base flange and a
side flange that extends upward from the base flange. The
side flange has a rear end with a pivot shaft defining a main
pivot axis. A front end of the side flange is spaced apart from
the base flange and includes a pivot mount. The second
bracket has a forward end and a rearward end. The rearward
end is connected to the pivot shaft of the side flange of the
first bracket for pivoting movement. A linear piston device
is fixed to the pivot mount of the side flange of the first
bracket. The second bracket is shaped and dimensioned such
that during pivoting movements the linear piston has a
non-contacting relationship with the second bracket.

18 Claims, 6 Drawing Sheets

(56) References Cited

U.S. PATENT DOCUMENTS

| | | | | |
|---|---|---|---|---|
| 11,572,724 | B2 * | 2/2023 | Steinbrecher | E05D 5/062 |
| 2004/0205934 | A1 * | 10/2004 | Derbis | E05F 1/1292 |
| | | | | 16/289 |
| 2007/0075554 | A1 * | 4/2007 | Gavriles | E05F 1/1091 |
| | | | | 292/339 |
| 2010/0294584 | A1 * | 11/2010 | Yuasa | E05D 5/062 |
| | | | | 180/274 |
| 2011/0031056 | A1 * | 2/2011 | Takahashi | B60R 21/38 |
| | | | | 180/274 |
| 2021/0129789 | A1 * | 5/2021 | Steinbrecher | E05D 11/00 |
| 2024/0351553 | A1 * | 10/2024 | Bartschies | B62D 25/12 |

FOREIGN PATENT DOCUMENTS

| | | | |
|---|---|---|---|
| EP | 2044282 | B1 | 1/2014 |
| EP | 2496465 | B1 | 5/2015 |
| IN | 202141015443 | A | 10/2022 |
| KR | 970075190 | A | 12/1997 |

* cited by examiner

VEHICLE HOOD HINGE ASSEMBLY

BACKGROUND

Technical Field

The present disclosure generally relates to a vehicle hood hinge assembly. More specifically, the present disclosure relates to a hood hinge assembly that is structured such that the two brackets of the hood hinge assembly are configured for freedom of rotation with respect to one another and free ends of the two brackets do not contact one another during rotation.

Background Information

Hood hinges are primarily designed to support a vehicle hood during movement of the vehicle hood between a closed orientation and an open orientation. Two brackets of hood hinges typically pivot relative to one another. However, during an impact event where impacting forces cause downward movement of an upper one of the two brackets is limited due to interference (contact) with the lower one of the two brackets.

SUMMARY

One object of the present disclosure is to provide a hinge with two brackets that pivot relative to one another with a non-interfering relationship such that in response to a downward force acting on the vehicle hood the upper one of the two brackets can pivot downward without contacting the lower of the two hinge brackets.

In view of the state of the known technology, one aspect of the present disclosure is to provide a. vehicle hood hinge assembly with a first bracket, a second bracket and a linear piston device. The first bracket has a base flange and a side flange that extends upward from the base flange, the side flange having a rear end with a pivot shaft that defines a main pivot axis. A front end of the side flange is spaced apart from the base flange and includes a pivot mount defines a forward swivel joint. The second bracket has a forward end and a rearward end. The rearward end is connected to the pivot shaft of the side flange of the first bracket for pivoting movement about the main pivot axis and the forward end is dimensioned and configured to attached to a vehicle hood. The linear piston device is fixed at a first end to the pivot mount of the side flange of the first bracket for pivotal movement about the forward pivot axis. The linear piston device is fixed to a portion of the vehicle front hood and is spaced apart from and forward of the forward end of the second bracket. The second bracket is shaped and dimensioned such that during pivoting movements of the second bracket the linear piston has a non-contacting relationship with the second bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
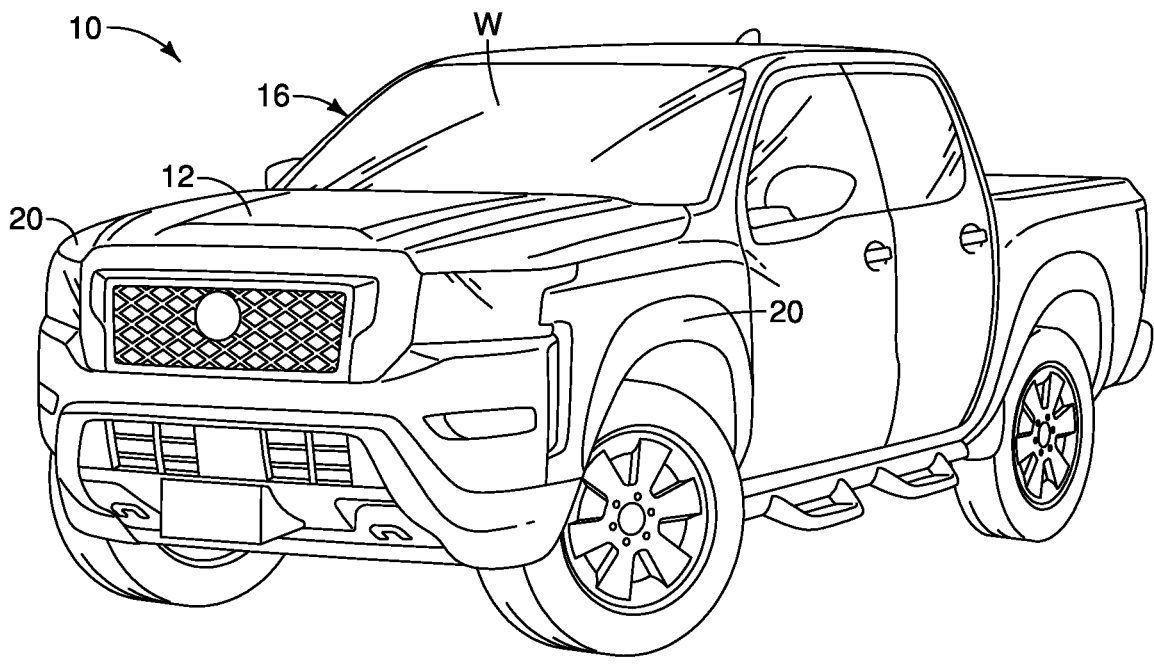
FIG. 1 is a perspective view of a vehicle that includes an engine compartment hood that includes hood hinges (not shown in FIG. 1) in accordance with an exemplary embodiment.
Figure 2:
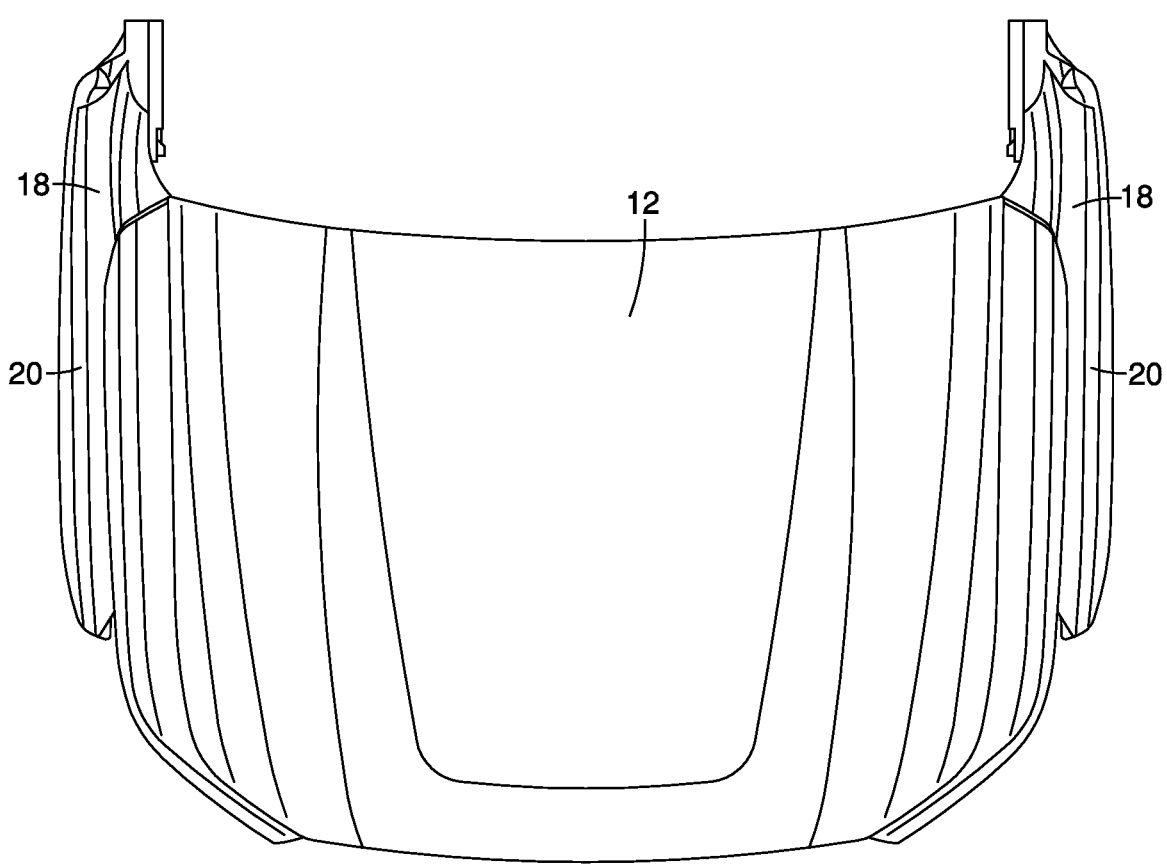
FIG. 2 is a top view of the hood removed from the vehicle in accordance with the exemplary embodiment.

Referring initially to FIG. 1, a vehicle 10 that includes a hood 12 (FIGS. 1 and 2) that is supported by a pair of hood hinges 14 (shown in FIGS. 3-11) is illustrated in accordance with a first embodiment. The hood 12 (also referred to as the vehicle hood 12) is dimensioned and positioned to cover an engine compartment (not shown) with the hood 12 in the closed orientation, as shown in FIG. 1.

The vehicle 10 includes a vehicle body structure 16 having a left and right front side structures 18 (FIG. 3) covered by fenders 20. The front side structures 18 at least partially define the engine compartment (not shown) therebetween.

Figures 3, 4:
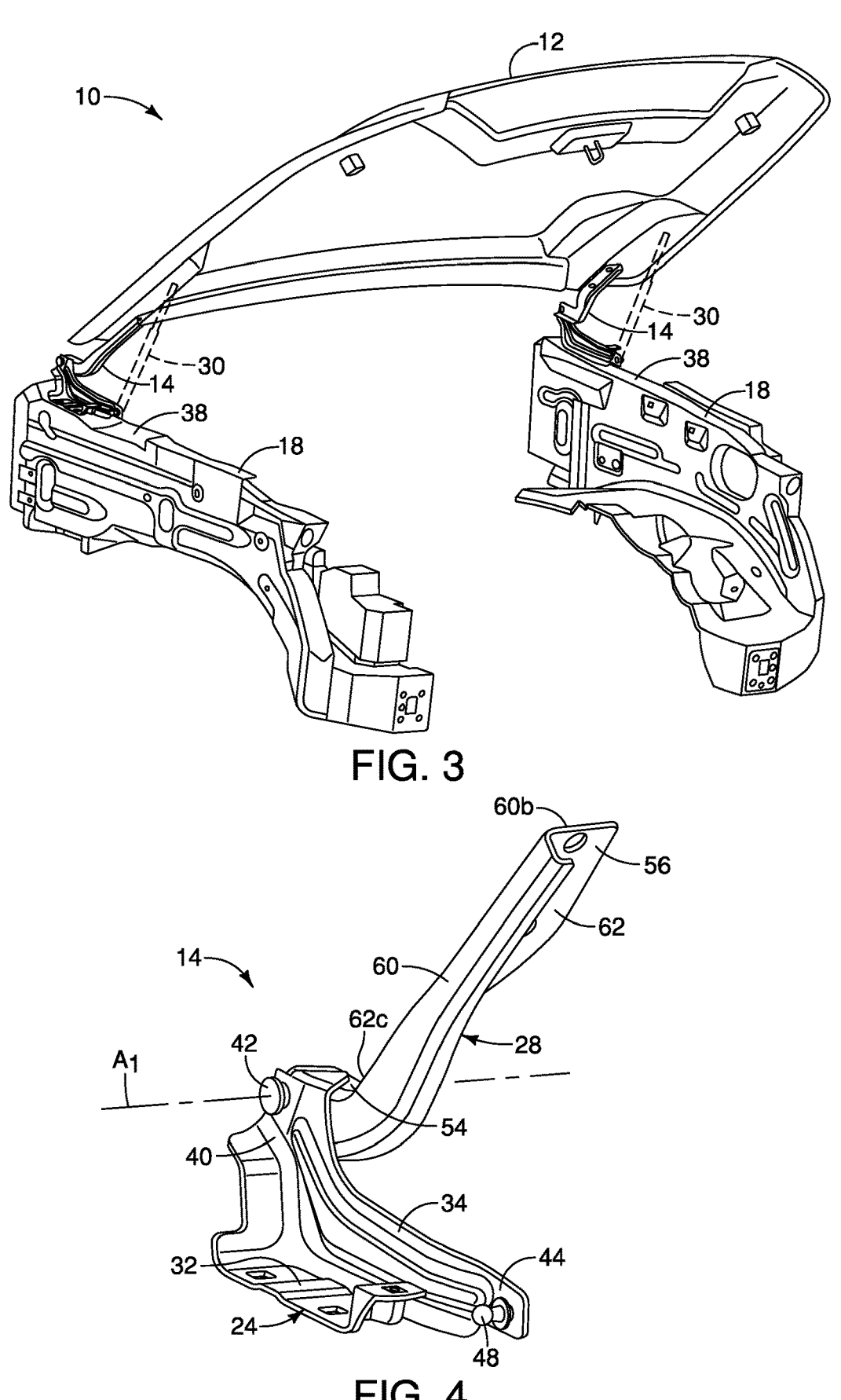
FIG. 3 is a perspective view of the hood, two hinges and front side structures of the vehicle shown removed from the vehicle with the hood in an open orientation in accordance with the exemplary embodiment.
FIG. 4 is a perspective view of the hood hinge in an open orientation showing a first bracket (a lower flange) and a second bracket (an upper bracket) removed from the vehicle in accordance with the exemplary embodiment.

As shown in FIG. 3, there are two hinges 14, one on either side of the hood 12 that support the hood 12 on the front side structure 18. The hinges 14 are identical except that they are symmetrical mirror images of one another. Hence description of only one of the hinges 14 will be provided below, since description of one hinge 14 applies equally to both hinges 14.

The hinge 14 (also referred to as a vehicle hood hinge assembly 14) includes a first bracket 24, a second bracket 28 and a linear piston device 30.

The first bracket 24 has a base flange 32 and a side flange 34 that extends upward from the base flange 32. The base flange 32 is dimensioned and configured to attach to a hood ledge 38 adjacent to the engine compartment (not shown) and a wind screen W (FIG. 1) of the vehicle 10.

The side flange 34 of the first bracket 24 has a rear end 40 that supports a pivot shaft 42 that defines a main pivot axis $A_1$. The side flange 34 also has a front end 44 that is spaced apart from the base flange 32 and includes a pivot mount 48 defines a forward swivel joint 50.

The second bracket 28 has a rearward end 54 and a forward end 56. The rearward end 54 is connected to the pivot shaft 42 of the side flange 34 of the first bracket 24 for pivoting movement about the main pivot axis $A_1$. Specifically, the forward end 56 of the second bracket 28 is configured to pivot about the main pivot axis $A_1$ between the open orientation and the closed orientation.

Figure 7:
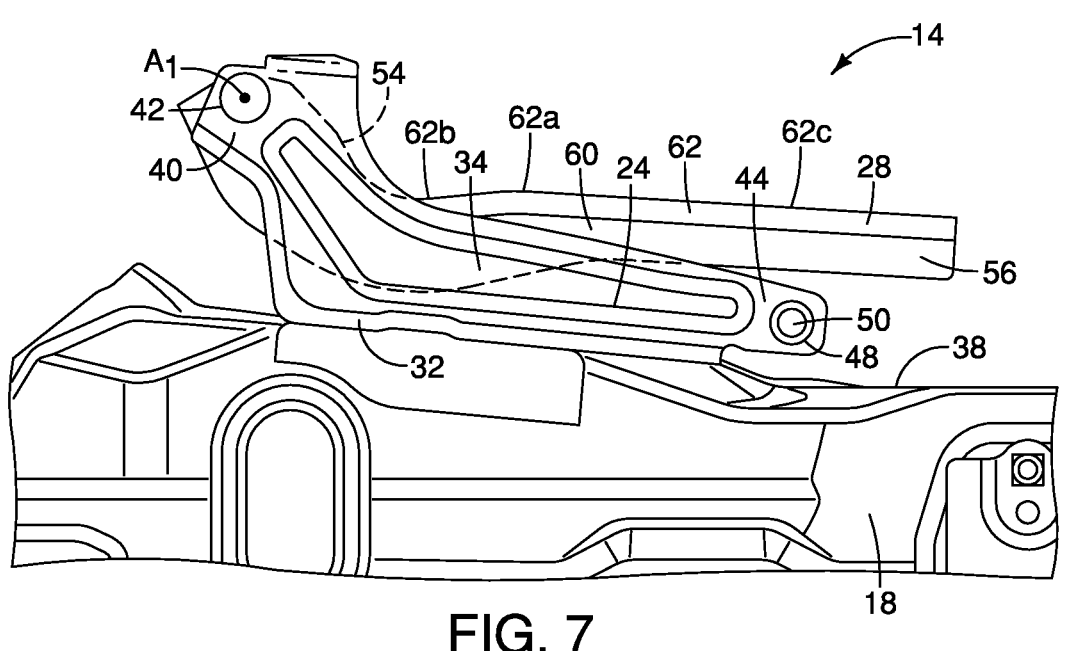
FIG. 7 is another side view of the hood hinge with the second bracket lowered to a position corresponding to the hood being in the closed orientation in accordance with the exemplary embodiment.
Figure 8:
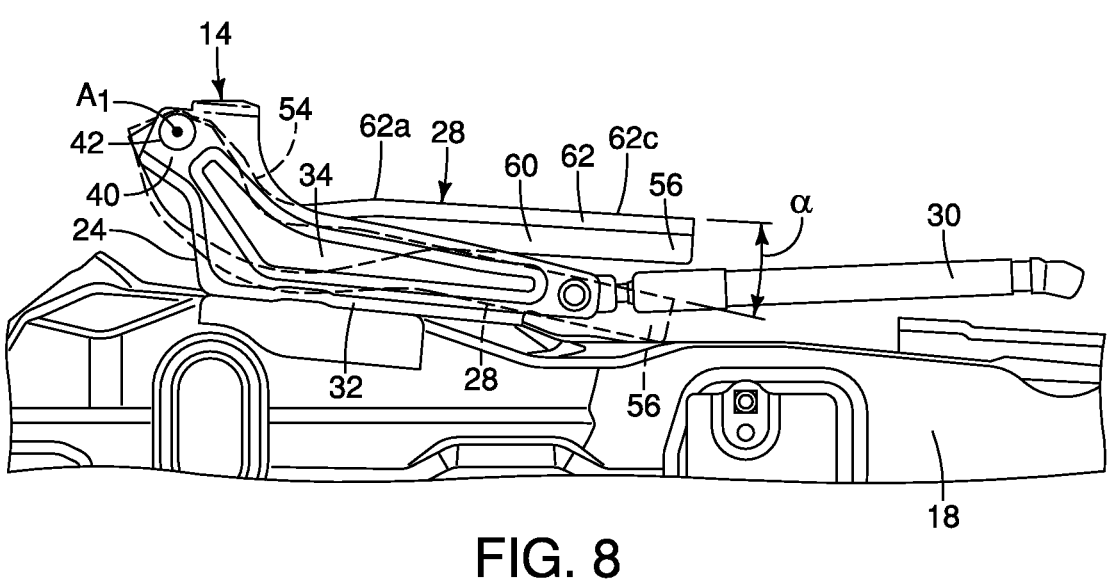
FIG. 8 is another side view of the hood hinge with the second bracket in solid lines in the position corresponding to the hood being in the closed orientation and showing the second bracket in phantom lines in a position lowered beyond the position corresponding to the hood being in the closed orientation position where the phantom line second bracket corresponding to the hood having been pushed downward in response to an impact event with a downward force acting on the hood and hinge in accordance with the exemplary embodiment.
Figure 9:
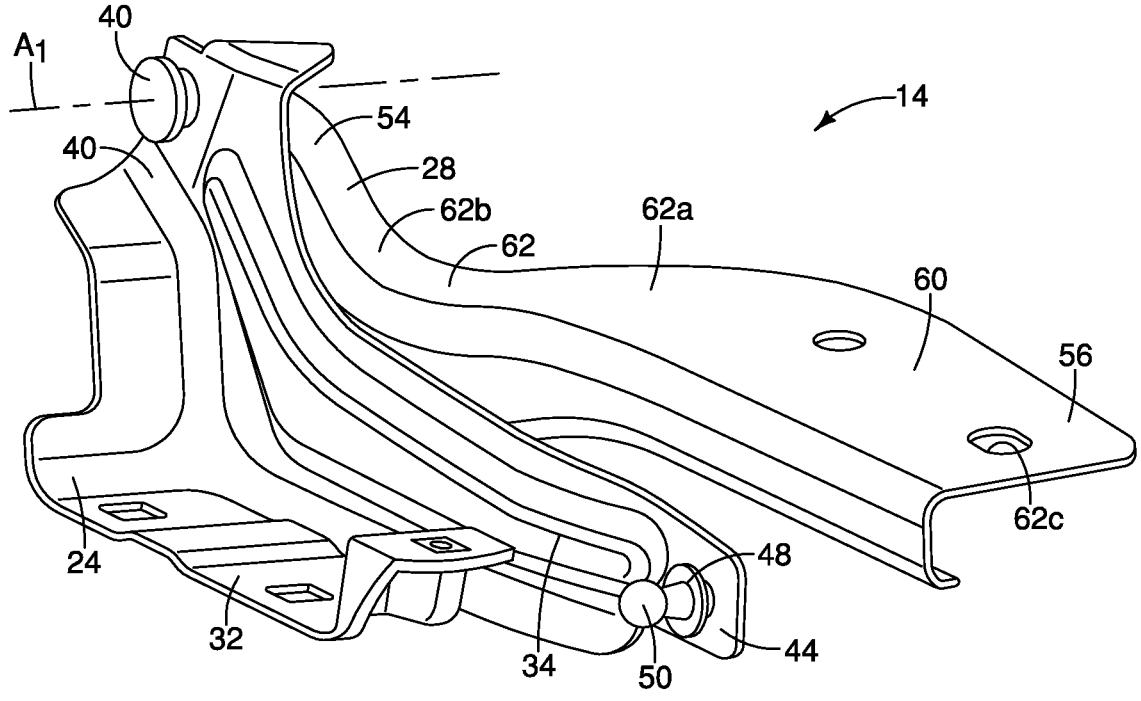
FIG. 9 is a perspective view of the hood hinge in the position corresponding the hood being in the closed orientation and removed from the vehicle in accordance with the exemplary embodiment.
Figure 10:
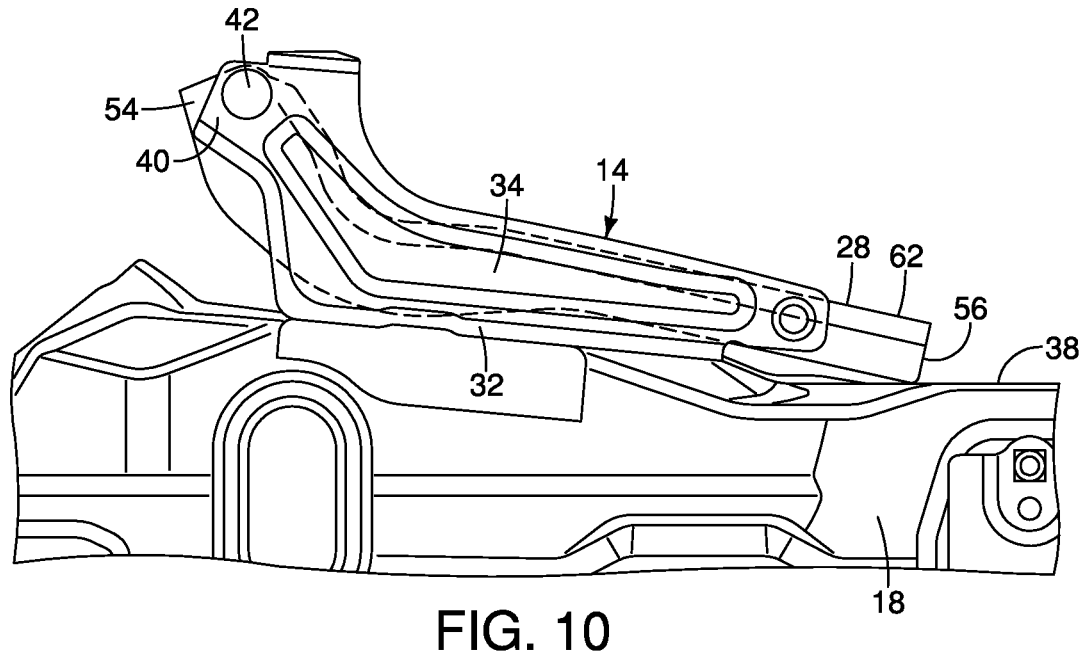
FIG. 10 is another side view of the hood hinge with the second bracket shown in the position lowered beyond the position corresponding to the hood being in the closed orientation position where the hood has been pushed downward in response to an impact event with a downward force acting on the hood and hinge in accordance with the exemplary embodiment.
Figure 11:
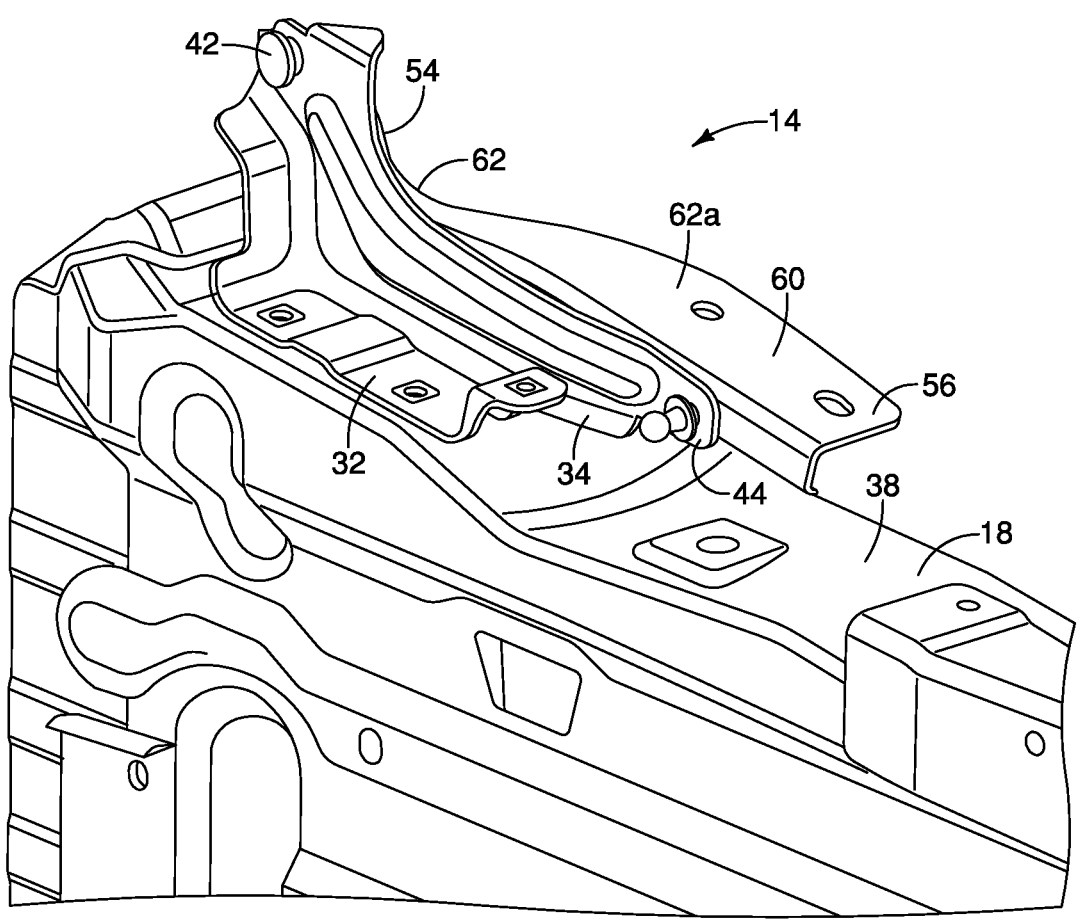
FIG. 11 is a perspective view of the hood hinge with the second bracket shown in the position lowered beyond the position corresponding to the hood being in the closed orientation position where the hood has been pushed downward in response to an impact event with a downward force acting on the hood and hinge in accordance with the exemplary embodiment.

The forward end 56 is dimensioned and configured to attach to and fully support the hood 12 with the hood 12 in an open orientation. The second bracket 28 undergoes pivotal movement about the main pivot axis $A_1$ between the open orientation (FIGS. 2, 4 and 6) and a closed orientation (FIGS. 7, 8 and 9). In response to an impact event with force F the second bracket 28 can pivot to a downward orientation (FIGS. 10 and 11) such that the forward end 56 of the second bracket 28 is lower than the forward end 56 in the closed orientation.

In response to an impact event with impacting force acting in a downward direction on the vehicle hood 12 proximate the first bracket 24 and the second bracket 28, the second bracket 28 is configured to further pivot downward from the closed orientation toward the hood ledge 38 and to the downward orientation without contacting the linear piston device 30. In other words, the forward end 56 of the second bracket 28 of the hinge 14 is shaped such that the forward end 56 is always spaced apart from the linear piston device 30 and the front end 44 of the side flange 34 of the first bracket 24.

Figure 5:
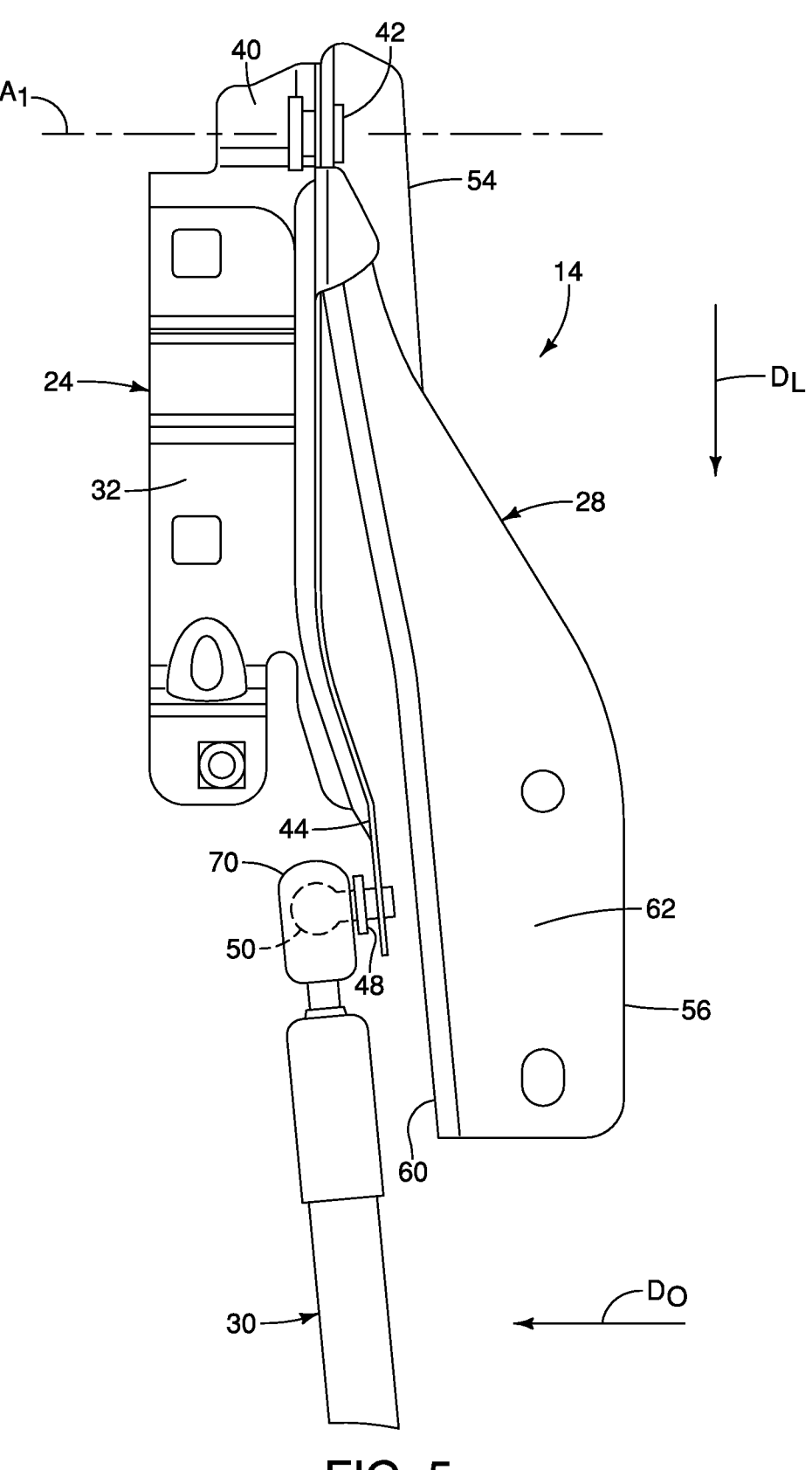
FIG. 5 is a top view of the hood hinge showing the first bracket and the second bracket with the distal end of the second bracket being spaced apart from a distal end of the first bracket such that there is no interference between the first and second brackets during rotational movement of the second bracket relative to the first bracket in accordance with the exemplary embodiment.
Figure 6:
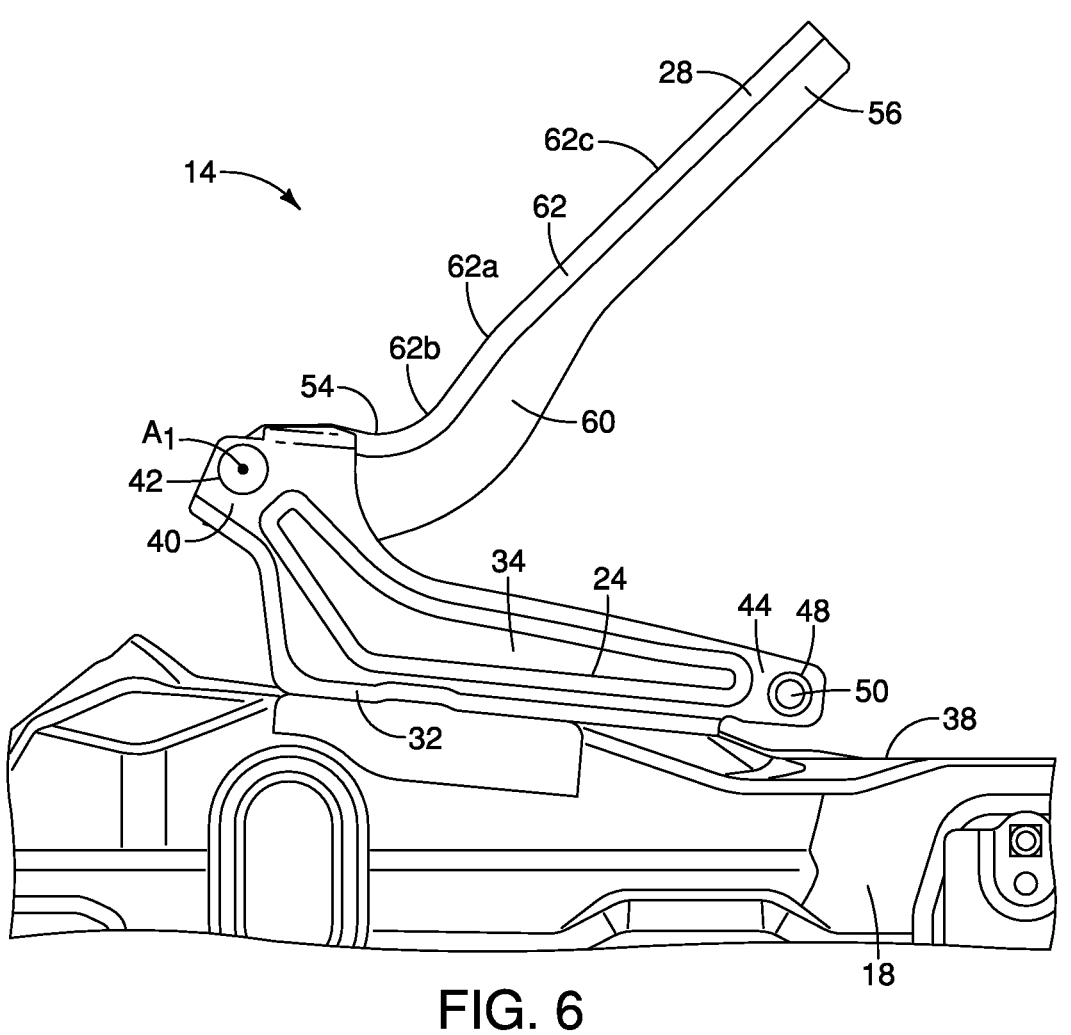
FIG. 6 is a side view of the hood hinge with the second bracket raised to a position corresponding to the hood being in the open orientation in accordance with the exemplary embodiment.

The second bracket 28 further includes a planar upright portion 60 and a contoured portion 62 with sections of the contoured portion 62 being perpendicular to the planar upright portion 60. An upward facing surface 62a of the contoured portion 62 of the second bracket 28 includes a curved section 62b and a planar section 62c. The planar section 62c is fixed to the vehicle hood 12 via mechanical fasteners (not shown). The planar section 62c extends away from the first bracket 24 such that the second bracket 28 has a non-contacting relationship with the front end 44 of the first bracket 24, as shown in FIG. 5. The second bracket 28 is also longer than the first bracket 24 in a vehicle longitudinal direction $D_L$, as is also shown in FIG. 5.

The pivot mount 48 that defines the forward swivel joint 50 with one end of the linear piston device 30 installed thereto, as shown in FIG. 5. The pivot mount 48 is located on the side flange 34 of the first bracket 24 and extends in an outboard direction $D_O$ from the side flange 34.

The linear piston device 30 (also referred to as a gas strut device) is basically a biasing member that is biased to elongate. The linear piston device 30 fixed at a first end 70 to the pivot mount 48 on the side flange 34 of the first bracket 24 for pivotal movement about the forward swivel joint 50. The linear piston device 30 and a second end 72 that is fixed to a portion of the vehicle front hood 12 spaced apart from and forward of the forward end 56 of the second bracket 28, as shown in FIG. 3. The second bracket 28 is shaped and dimensioned such that during pivoting movements of the second bracket 28 about the main pivot axis $A_1$ the linear piston 30 also has a non-contacting relationship with the second bracket 28.

The linear piston device 30 is installed to the vehicle body structure 16 and the hood 12 such that the linear piston device 30 biases the hood 12 toward the open orientation. Since linear piston devices and gas strut devices are conventional automotive components, further description is omitted for the sake of brevity.

As is also shown in FIG. 5, the rear end of the side flange 34 is generally planar and the front end of the side flange 34 of the first bracket 24 has a curved portion such that the forward swivel joint 50 is located in a section of the front end 44 that is offset from a plane defined by the rear end of the side flange 34.

The geometry and shape of the second bracket 28 is such that as the second bracket 28 pivots about the pivot shaft 42, the second bracket 28 is free to pivot without interference from the first bracket 24. Hence, during an impact event where a downward force acts on areas of the hood 12 proximate the hinges 14, it is possible for the second bracket 28 to an orientation where the forward end 56 (the distal end) of the second bracket 28 can pivot to a position parallel or lower than the forward swivel joint 50.

The various panels and frame structures are conventional components that are well known in the art. Since such panels and frame structures are well known in the art, these structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the hood hinge 12. Accordingly, these terms, as utilized to describe the present invention should be interpreted relative to a vehicle equipped with the hood hinge 12.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle hood hinge assembly, comprising:
a first bracket having a base flange and a side flange that extends upward from the base flange, the side flange having a rear end with a pivot shaft that defines a main pivot axis and a front end of the side flange is spaced apart from the base flange and includes a pivot mount that defines a forward pivot axis;
a second bracket having a forward end and a rearward end, the rearward end being connected to the pivot shaft of the side flange of the first bracket for pivoting movement about the main pivot axis and the forward end being dimensioned and configured to be attached to a vehicle hood; and
a linear piston device fixed at a first end to the pivot mount of the side flange of the first bracket for pivotal movement about the forward pivot axis, the linear piston device being fixed to a portion of the vehicle front hood spaced apart from and forward of the forward end of the second bracket, the second bracket being spaced apart from the linear piston such that during pivoting movements of the second bracket the linear piston has a noncontacting relationship with the second bracket, the linear piston device and the second bracket being on opposite sides of the side flange of first bracket,
the second bracket being spaced apart from the first bracket forward of the pivot shaft such that the second bracket (i) pivots about the main pivot axis between an open orientation and a closed orientation, and (ii) further moves past the closed orientation to a downward orientation in response to an impact event without the second bracket forward of the pivot shaft contacting the first bracket.

2. The vehicle hood hinge assembly according to claim 1, wherein
the base flange of the first bracket is dimensioned and configured to attach to a hood ledge adjacent to an engine compartment of a vehicle, the vehicle hood being dimensioned and positioned to cover the engine compartment with the vehicle hood in the closed orientation.

3. The vehicle hood hinge assembly according to claim 1, wherein
the forward end of the second bracket is configured to pivot about the main pivot axis at the rear end of the side flange of the first bracket between the open orientation and the closed orientation, and
in response to the impact event with impacting force acting in a downward direction on the vehicle hood proximate the first and second brackets, the second bracket is configured to further pivot downward from the closed orientation toward a hood ledge and to the downward orientation without contacting the linear piston device.

4. The vehicle hood hinge assembly according to claim 1, wherein
the rear end of the side flange is perpendicular to the base flange.

5. The vehicle hood hinge assembly according to claim 4, wherein
the rear end of the side flange is generally planar and the front end of the side flange of the first bracket has a curved portion such that the forward pivot axis is located in a section of the front end that is offset from a plane defined by the rear end of the side flange.

6. The vehicle hood hinge assembly according to claim 1, wherein
the rear end of the side flange is generally planar and the front end of the side flange of the first bracket has a curved portion such that the forward pivot axis is located in a section of the front end that is offset from a plane defined by the rear end of the side flange.

7. The vehicle hood hinge assembly according to claim 1, wherein
the second bracket includes a planar upright portion and a contoured portion with sections of the contoured portion being perpendicular to the planar upright portion.

8. The vehicle hood hinge assembly according to claim 7, wherein
an upward facing surface of the contoured portion of the second bracket includes a curved section and a planar section, the planar section being fixed to the vehicle hood.

9. The vehicle hood hinge assembly according to claim 1, wherein
the forward end of the second bracket is configured to pivot about the main pivot axis between the open orientation and the closed orientation, and
in response to the impact event with impacting force acting in a downward direction on the vehicle hood proximate the first and second brackets, the second bracket is configured to further pivot downward from the closed orientation to a hood ledge adjacent to an engine compartment of a vehicle without contacting the linear piston device.

10. The vehicle hood hinge assembly according to claim 1, wherein
the second bracket is longer than the first bracket in a vehicle longitudinal direction.

11. The vehicle hood hinge assembly according to claim 1, wherein
the pivot mount that defines the forward pivot axis on the side flange of the first bracket extends in an outboard direction from the side flange.

12. The vehicle hood hinge assembly according to claim 1, wherein a lower surface of the forward end of the second bracket is above the pivot mount in the closed orientation and below the pivot mount in the downward orientation.

13. The vehicle hood hinge assembly according to claim 1, wherein the linear piston device is a biasing member that is biased to elongate.

14. The vehicle hood hinge assembly according to claim 1, wherein the forward end of the second bracket is lower than the rearward end of the second bracket in the closed orientation and in the downward orientation.

15. The vehicle hood hinge assembly according to claim 1, wherein the pivot mount that defines the forward pivot axis on the side flange of the first bracket is outboard of the second bracket.

16. The vehicle hood hinge assembly according to claim 1, wherein the forward end of the second bracket is spaced apart from the forward end of the first bracket in the closed orientation and the downward orientation.

17. A vehicle comprising the vehicle hood hinge assembly according to claim 1, wherein the pivot mount that defines the forward pivot axis on the side flange of the first bracket is outboard of the second bracket.

18. A vehicle comprising the vehicle hood hinge assembly according to claim 1, the vehicle further comprising a first side hood ledge, and a second side hood ledge, the vehicle hood hinge assembly being a first side vehicle hood hinge assembly attached to the first side hood ledge, with the pivot mount that defines the forward pivot axis on the side flange of the first bracket being outboard of the second bracket attached to the vehicle hood, and the vehicle further comprising a second side vehicle hood hinge assembly attached to the second side hood ledge, the second side vehicle hood hinge assembly having an additional pivot mount that defines an additional forward pivot axis on an additional side flange of an additional first bracket that is outboard of an additional second bracket attached to the vehicle hood.

\* \* \* \* \*